United States Patent [19]
Kuratomi

[11] Patent Number: 5,936,799
[45] Date of Patent: *Aug. 10, 1999

[54] MAGNETIC HEAD WITH CORE PORTIONS CONNECTED BY SHOCK-ABSORBING PORTION

[75] Inventor: Isao Kuratomi, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/783,705

[22] Filed: Jan. 15, 1997

[30] Foreign Application Priority Data

Jan. 16, 1996 [JP] Japan ................ 8-005089

[51] Int. Cl.$^6$ .......... G11B 33/08; G11B 21/20; G11B 5/48; G11B 5/187
[52] U.S. Cl. ............ 360/97.03; 360/102; 360/104; 360/122
[58] Field of Search ............ 360/104, 97.03, 360/98.01, 98.02, 98.03, 102, 103, 105, 122

[56] References Cited

U.S. PATENT DOCUMENTS

| | | | |
|---|---|---|---|
| 3,657,712 | 4/1972 | Dirks | 360/98.01 |
| 3,940,794 | 2/1976 | Griffiths et al. | 360/98.03 |
| 5,082,827 | 1/1992 | Barnes | 360/105 |
| 5,159,508 | 10/1992 | Grill et al. | 360/103 |

FOREIGN PATENT DOCUMENTS

| | | |
|---|---|---|
| 56-107361 | 8/1981 | Japan . |
| 58-100274 | 6/1983 | Japan . |
| 62-099967 | 5/1987 | Japan . |
| 63-37874 | 2/1988 | Japan . |
| 2-218078 | 8/1990 | Japan . |
| 3-105717 | 5/1991 | Japan . |
| 3-263664 | 11/1991 | Japan . |
| 4-232682 | 8/1992 | Japan . |
| 5-81805 | 4/1993 | Japan . |
| 6-168427 | 6/1994 | Japan . |
| 6-231555 | 8/1994 | Japan . |

OTHER PUBLICATIONS

"Magnetic Disk Device", P1185, vol. 15, No. 127, Japanese Patent Abstract of 03–012079 to Suenaga, Mar. 27, 1991.

*Primary Examiner*—Craig A. Renner
*Attorney, Agent, or Firm*—Sughrue, Mion, Zinn, Macpeak & Seas, PLLC

[57] ABSTRACT

A magnetic head for use in a magnetic disk drive and for recording and reproducing data to and from adjacent magnetic disks, the magnetic head being in contact with the magnetic disks while the adjacent magnetic disks spin, a magnetic head core included in the magnetic head and affixed to a free end of a head support has a recording/reproducing function on each of opposite major surfaces thereof, wherein the major surfaces respectively face recording surfaces of the adjacent magnetic disks. The head core is symmetrical with respect to a plane containing the center of the head core and parallel to the recording surfaces of the adjacent disks. Each major surface of the head core records and reproduces data to and from the adjacent disks and slidingly contacts the surface of one of the adjacent disks. An elastic body intervenes between the opposite major surfaces of the head core.

15 Claims, 3 Drawing Sheets

MAGNETIC HEAD WITH CORE PORTIONS CONNECTED BY SHOCK-ABSORBING PORTION

BACKGROUND OF THE INVENTION

The present invention relates to a magnetic head for writing and reading data out of a magnetic disk or medium, and a magnetic disk drive playing the role of an external storage associated with a computer.

Today, many magnetic disk drives using magnetic disks as recording media use a so-called contact start and stop (CSS) type recording and reproducing system. In this type of system, while a disk drive is not operated, a magnetic head included in the disk drive rests stationary on a magnetic disk. When the disk spins at the beginning of operation, a stream of air is generated between the disk and the head and causes the head to float above the disk for writing or reading data in or out of the disk.

The distance between a magnetic body included in the disk and a recording/reproducing element included in the head floating above the disk is referred to as a magnetic spacing. Reducing the magnetic spacing, among the others, is the key to the high density recording of the disk. Recently, a magnetic spacing as small as 100 nm or below has been achieved. However, the magnetic spacing should be further reduced in order to implement the recording density of future magnetic disks. Therefore, the ultimate system is one in which the surface of the disk and the recording/reproducing element of the head contact each other in order to minimize the magnetic spacing. This kind of system is generally called a contact recording type system and attracting increasing attention as a substitute for the traditional CSS type system.

Modern magnetic disk drives are loaded with a plurality of magnetic disks in order to increase the total storage capacity. For example, a 3.5-inch disk drive promising a relatively great storage capacity is usually loaded with a stack of eight to twelve disks.

Two different measures are available for increasing the capacity of a magnetic disk drive, one which increases the recording density with which a magnetic head can record and reproduce data with a single disk, and the other which increases the total capacity of a single disk drive. Although the contact recording system is effective to increase the storage capacity for a single disk, it has some issues yet to be solved, as follows.

In the contact recording system, during recording or reproduction, the head slides on the surface of the disk while the disk spins. The disk is mounted on and driven by a rotatable spindle which forms a part of the disk drive. However, the disk involves a revolution runout component ascribable to the deviation between the recording surface of the disk and the axis of the spindle and the insufficient accuracy of the revolution surface of the spindle itself with respect to its axis. The deviation between the recording surface of the disk and the axis of the spindle is ascribable to assembly errors. Moreover, the recording surface of the disk is not fully flat or smooth, but has waving, roughness and other surface configuration components.

The revolution run-out component and surface configuration components, i.e., displacement in the direction perpendicular to the recording surface of the disk is not desirable in the contact recording type system for the following reason. When the head slides on the disk, the above displacement prevents the head from accurately following the disk and causes it to jump away from the disk. This brings about the following problems.

First, the magnetic spacing fluctuates and makes it difficult to produce a stable output during recording or reproduction, resulting in write errors or read errors. Second, the intermittent contact of the head with the disk causes the pressing load of the head acting on the disk to sharply increase for a moment. This, coupled with an impact, causes a great frictional force to act between the disk and the head for a moment while causing the disk and head to deform. Such a frictional force accelerates the wear of the disk and thereby lowers the reliability of the disk.

On the other hand, the total capacity of a single disk drive will be increased if a greater number of disks are mounted on the disk drive. However, in the conventional head and disk assembly, two heads are interposed between adjacent disks. As a result, the distance between adjacent disks cannot be reduced beyond a certain limit. It follows that the number of disks that can be mounted on a single disk drive is limited by the size of the disk drive.

Technologies relating to the present invention are disclosed in, e.g., Japanese Patent Laid-Open Publication No. 6-231555.

SUMMARY OF THE INVENTION

It is therefore an object of the present invention to provide a magnetic head and a magnetic disk drive capable of obviating the jump in the contact recording type system and thereby implementing a stable recording/reproducing characteristic and high reliability, while promoting the increase in capacity.

In accordance with the present invention, in a magnetic head for a magnetic disk drive and for recording and reproducing data out of a magnetic disk in contact with the disk while the disk spins, a magnetic head core included in the magnetic head and affixed to the free end of a head support has a recording/reproducing function on its opposite major surfaces capable of facing the recording surface of the disk.

Further, in accordance with the present invention, in a magnetic disk drive for recording and reproducing data out of a magnetic disk, a magnetic head includes a head core affixed to the free end of a head support for recording and recording data and sandwiched between and held in contact with the recording surfaces of two adjacent magnetic disks.

Moreover, in accordance with the present invention, in a magnetic disk drive for recording and reproducing data out of a magnetic disk, a magnetic head includes a head core affixed to the free end of a head support has opposite major surfaces facing the recording surfaces of two adjacent magnetic disks, and each having a recording/reproducing function.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
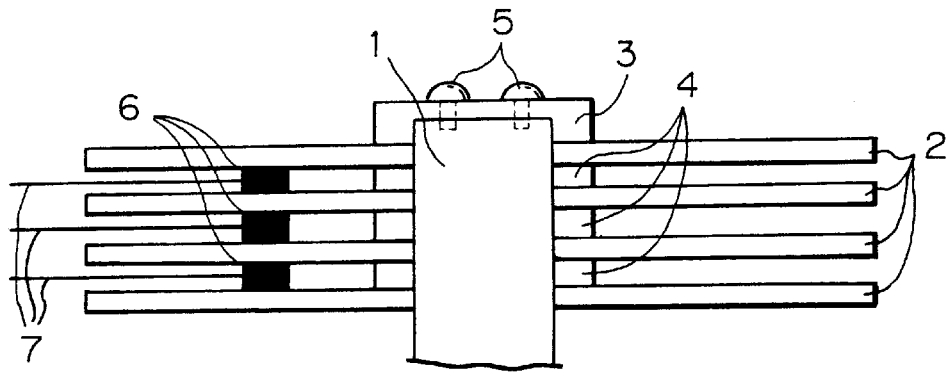
FIG. 1 is a front view showing a magnetic disk drive embodying the present invention.
Figure 2:
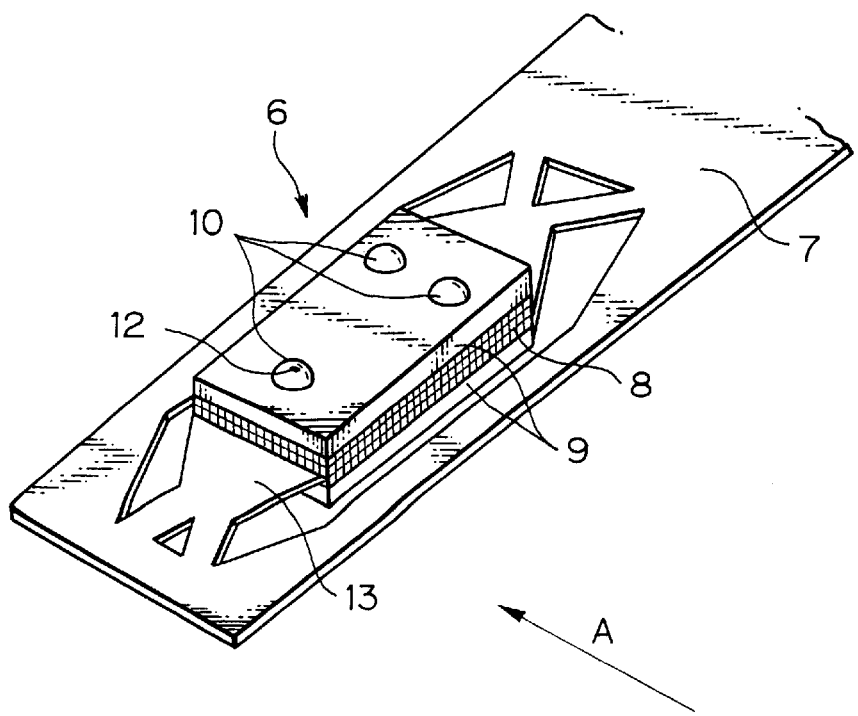
FIG. 2 is an enlarged perspective view showing a magnetic head core included in the embodiment.
Figure 3:
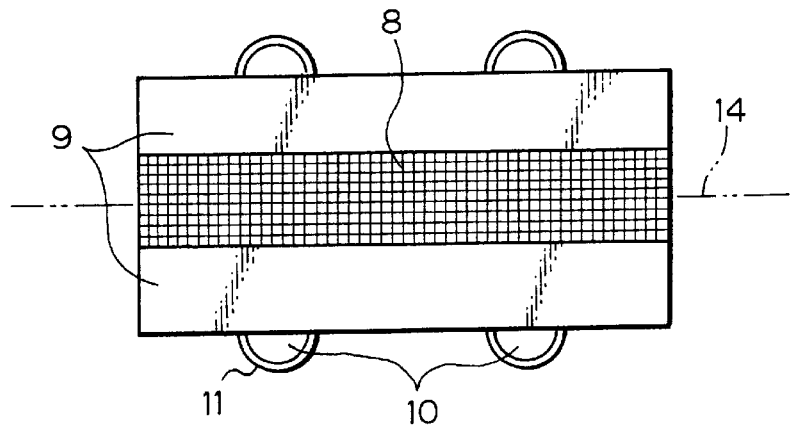
FIG. 3 is a front view as seen in a direction A of FIG. 2.

Referring to FIGS. 1–3, a magnetic disk drive embodying the present invention is shown. As shown, the disk drive includes a spindle 1 rotatably mounted on a stationary shaft, not shown, and driven by a motor, not shown. A plurality of magnetic disks or media 2 and a plurality of spacers 4 are stacked on the spindle 1 alternately. A damper 3 is fastened to the top of the spindle 1 by screws 5 in order to clamp the stack of disks 2 and spacers 4. Magnetic head cores 6 are each interposed between and held in contact with the recording surfaces of the adjacent disks 2. Each head core 6 is supported by a head support 7. Each head core 6 has a shock-absorbing portion 8, a pair of core bases 9 sandwiching the shock-absorbing portion 8, contact pads 10 provided on the core bases 9, films 11 coating the surfaces of the contact pads 10, and magnetic elements 12 provided on some of the contact pads 10 as will be described specifically later. The head support 7 includes a gimbal portion 13 supporting the head core 6. The reference numeral 14 designates the center line of each head core 6.

In the above configuration, a recording or reproducing seek operation is transmitted to any one of the head cores 6 via the associated head support 7, as commanded by a host.

As shown in FIG. 2, three contact pads 10 are fitted on each core base 9 of each head core 6. The head core 6 contacts the adjacent disks 2 via the contact pads 10. During recording or reproduction, the head core 6 and adjacent disks 2 slide on each other due to the rotation of the disks 2. As shown in FIG. 3, the films 11 each coats the surface of the respective contact pad 8 in order to enhance resistivity to wear due to friction. In the illustrative embodiment, each film 11 consists of an Si layer and an amorphous carbon layer sequentially formed by sputtering. Alternatively, the films 11 may be implemented by SiC or similar metal carbide or $SiO_2$, $ZrO_2$ or similar metal oxide. Also, use may be made of an ion beam method scheme or a CVD (Chemical Vapor Deposition) scheme in place of sputtering.

The magnetic elements 12 are each fitted on the top of one of the three contact pads 10. The contact pad 10 with the magnetic element 12 has thereinside a coil element and other elements for implementing a function of generating and detecting a leakage magnetic field in the gap of the magnetic element 12 in response to a recording or reproducing signal.

The head core 6 is adhered to the respective head support 7. The head support 7 is slit around the head core 6 in order to form the gimbal portion 13. With the gimbal portion 13, the head core 6 is capable of flexibly coping with displacement in the direction perpendicular to the recording surfaces of the disks 2. This displacement is ascribable to the revolution run-out component and surface configuration components particular to each disk 2, as discussed earlier. Such a configuration of the head core 6 reduces variation in the contact load exerted by the contact pads 10 on the disks 2.

As shown in FIG. 3, the head core 6 is symmetrical with respect to the center line 14. The core bases 9 sandwich the shock-absorbing portion 8 at the center of the head core 6. The shock-absorbing portion 8 plays the role of a spring and allows the contact pads 10 of the opposite core bases 9 to exert the same load on the adjoining disks 2. For the shock-absorbing portion 8, use is made of a material having great mechanical strength, relatively small coefficient of elasticity, and relatively broad range of elasticity. In the illustrative embodiment, the shock-absorbing portion 8 is implemented by a bulk of graphite carbon.

Figure 4:
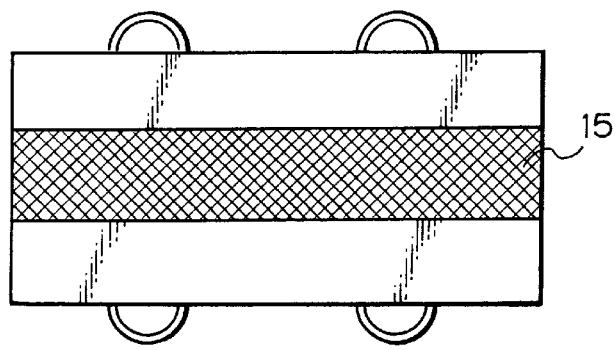
FIG. 4 is a front view showing a magnetic head core representative of an alternative embodiment of the present invention.
Figure 5:
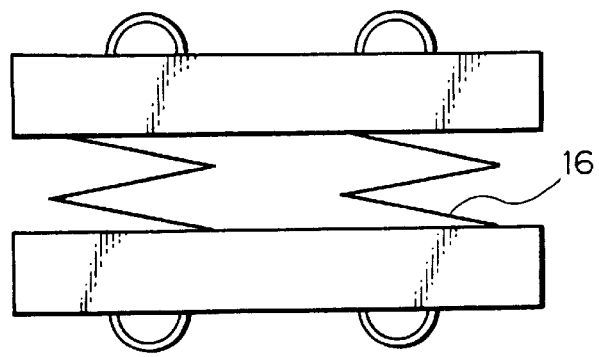
FIG. 5 is a front view showing a magnetic head core representative of another alternative embodiment of the present invention.

FIG. 4 shows a head core representative of an alternative embodiment of the present invention. As shown, the head core includes a shock-absorbing portion 15 formed of hard rubber. FIG. 5 shows a head core representative of another alternative embodiment of the present invention and including a shock-absorbing portion 16 implemented by leaf springs in place of a bulk. The crux is that the shock-absorbing portion plays the role of a spring acting on the opposite core bases.

A series of experiments were conducted in order to compare the present invention and the prior art, as follows.

Figure 6:
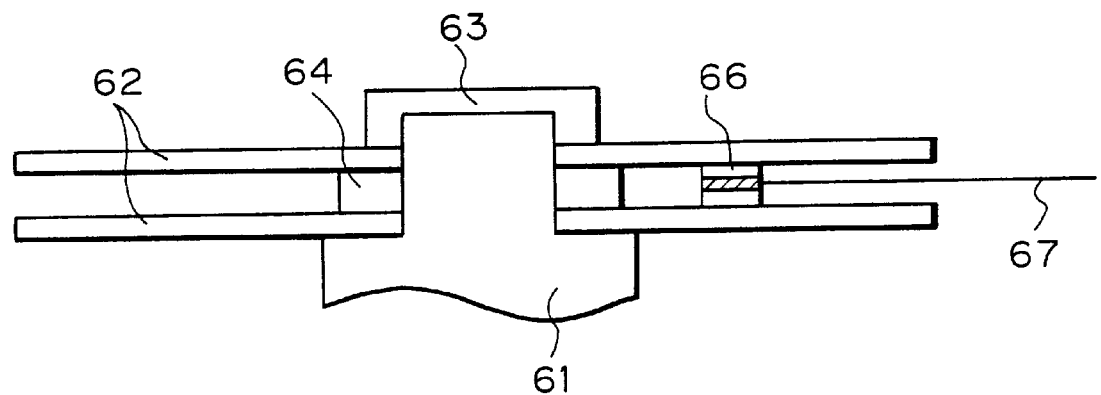
FIG. 6 is a front view of a magnetic disk drive in accordance with the present invention and constructed for test.

FIG. 6 shows an experimental magnetic disk drive in accordance with the present invention. As shown, the disk drive has two magnetic disks 62 mounted on a spindle 61, and a spacer 64 intervening between the disks 62. A damper 63 is affixed to the top of the spindle 61 in order to clamp the disks 62 and spacer 64. A magnetic head core 66 is adhered to the free end of a head support 67 and held in contact with the surfaces of the disks 62 facing each other. Specifically, the head core 66 contacts the disks 62 via contact pads while the head support 67 has a gimbal structure around the head core 66, although not shown specifically.

Figure 7:
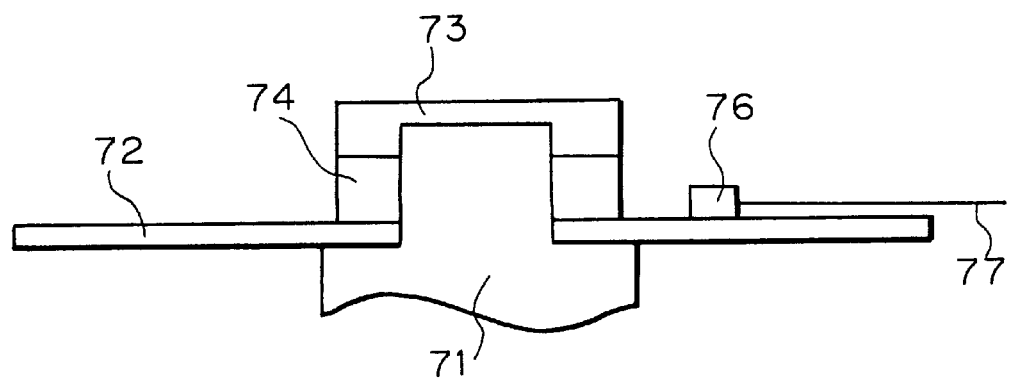
FIG. 7 is a view similar to FIG. 6, showing a conventional magnetic disk drive also constructed for test.

FIG. 7 shows a specific configuration of a conventional magnetic disk drive and used for test. As shown, the disk drive includes a spindle 71 on which a single magnetic disk 72 is mounted and fixed in place by a spacer 74 and a damper 73. A magnetic head core 76 is adhered to the free end of a head support 77 and pressed against the disk 72. For the test, the disk drive is configured such that the head core 76 is constantly held in contact with the disk 72 during recording and reproduction by a stream of air derived from the rotation of the disk 72. The head core 76, like the head core 66 of the present invention, contacts the disk 72 via contact pads provided thereon. Also, the head support 77 has a gimbal structure around the head core 72.

First, the disk drives shown in FIGS. 6 and 7 were evaluated as to the contact of the disk and head. For the evaluation, 24 Mfc signals were recorded in the disks 62 and 72 and then reproduced in order to compare the single-turn envelopes of the resulting waveforms. The test showed that the disk drive of the present invention produces a stable output while the conventional disk drive suffers from fine modulation presumably ascribable to the variation of magnetic spacing.

Further, the disks 62 and 72 were each caused to spin for 100 hours at a speed of 3,600 rpm. After the test, scratch-like marks were observed on the surface of the conventional disk 72 slid on the head core 76. By contrast, the surfaces of the disks 62 of the present invention showed no changes. That is, the disk 72 was damaged more easily than the disks 62.

Moreover, the present invention noticeably reduces the distance between nearby disks, as follows. For the test, use was made of a conventional 3.5-inch magnetic disk drive loaded with 0.80 mm thick 3.5-inch disks and 1-inch high. A magnetic disk drive in accordance with the present invention was also loaded with 0.80 thick 3.5-inch magnetic disks and 1-inch high. Table 1 compare the conventional disk drive and the disk drive of the present invention as to the distance between the disks and the number of disks that can be mounted on the disk drive, as determined by experiments.

TABLE 1

|  | INVENTION | PRIOR ART |
| --- | --- | --- |
| DISTANCE BETWEEN DISKS | 1.5 mm | 4 mm |
| NUMBER OF DISKS TO BE MOUNTED ON 1" HIGH DISK DRIVE | 8 | 4 |

As Table 1 indicates, the present invention noticeably reduces the distance between the adjoining disks, compared to the conventional disk drive. The present invention therefore allows a greater number of disks to be mounted on a single disk drive and thereby increases the total storage capacity of the disk drive.

In summary, in accordance with the present invention, a contact recording type magnetic disk drive constantly holds a magnetic disk and a magnetic head thereof in contact during recording and reproduction. This successfully obviates the variation of magnetic spacing and thereby insures a stable recording/reproducing characteristic. In addition, a load acting between the disk and the head remains substantially constant. Therefore, the head is prevented from jumping while sliding on the disk. The jump of the head would bring about unusual wear due to the resulting impact or excessive pressing load. It follows that the disk and head slide on each other with a stable frictional wear characteristic, enhancing the reliability of the disk drive. Moreover, for a given size and height, the disk drive of the present invention allows a greater number of disks to be mounted than the conventional disk drive. This increases the storage capacity of the disk drive.

Various modifications will become possible for those skilled in the art after receiving the teachings of the present disclosure without departing from the scope thereof.

What is claimed is:

1. A magnetic head for use in a magnetic disk drive and for recording and reproducing data to and from adjacent magnetic disks, said magnetic head being in contact with said adjacent magnetic disks while said adjacent magnetic disks spin and remain completely flat and parallel to one another, said magnetic head comprising:

a magnetic head core affixed to a free end of a head support such that opposite major surfaces thereof respectively face recording surfaces of said adjacent magnetic disks, said magnetic head core having a recording/reproducing function on each of said opposite major surfaces thereof, and comprising a first core body and a second core body connected to each other by a shock-absorbing portion therebetween, whereby said opposite major surfaces contact said adjacent magnetic disks with substantially the same load to prevent pressure from concentrating on one surface of said head core and thereby ensuring stable contact of said head core and said adjacent magnetic disks.

2. The magnetic head as claimed in claim 1, wherein said magnetic head core is symmetrical with respect to a plane containing a center of said magnetic head core and parallel to said adjacent magnetic disks.

3. The magnetic head as claimed in claim 1, wherein said opposite major surfaces of said magnetic head core each comprises a first means for recording and reproducing data to and from a respective one of said adjacent magnetic disks and a second means for slidingly contacting the surface of the respective one of said adjacent magnetic disks, and wherein said shock-absorbing portion comprises an elastic body intervening between said first and second means provided on said opposite major surfaces of said head core.

4. The magnetic head as claimed in claim 3, wherein said second means comprises at least one projection formed on said magnetic head core.

5. The magnetic head as claimed in claim 4, wherein said at least one projection has a gap at a top thereof for recording and reproducing data to and from the respective one of said adjacent magnetic disks.

6. The magnetic head as claimed in claim 3, wherein said elastic body is formed of graphite carbon.

7. The magnetic head as claimed in claim 3, wherein said elastic body is formed of hard rubber.

8. The magnetic head as claimed in claim 3, wherein said elastic body comprises a spring.

9. A magnetic head assembly comprising the magnetic head as claimed in claim 3 in combination with the head support, wherein said head support is capable of being positioned such that said opposite major surfaces of said head core contact said adjacent magnetic disks with an even load due to elasticity of said elastic body.

10. The magnetic head as claimed in claim 9, wherein said head support is slit around said head core in order to form a gimbal structure.

11. The magnetic head as claimed in claim 3, wherein said second means comprises a plurality of projections formed on said magnetic head core.

12. The magnetic head as claimed in claim 11, wherein only one of said plurality of projections includes a magnetic element.

13. The magnetic head as claimed in claim 11, wherein said plurality of projections have a film coating for resisting wear.

14. In a magnetic disk drive for recording and reproducing data to and from a magnetic disk, a magnetic head comprises:

a head core, for recording and reproducing data, (1) affixed to a free end of a head support, (2) sandwiched between two adjacent magnetic disks, such that opposite major surfaces of said head core are held in contact with recording surfaces of said adjacent magnetic disks while said adjacent magnetic disks remain completely flat and parallel to one another, each of said opposite major surfaces having a recording/reproducing function, and (3) including a first core body and a second core body connected to each other by a shock-absorbing portion therebetween, whereby said opposite major surfaces contact said adjacent magnetic disks with substantially the same load to prevent pressure from concentrating on one surface of said head core and thereby ensuring stable contact of said head core and said adjacent magnetic disks.

15. In a magnetic disk drive for recording and reproducing data to and from a magnetic disk, a magnetic head includes a head core (1) affixed to a free end of a head support, (2) having opposite major surfaces facing recording surfaces of two adjacent magnetic disks while said adjacent magnetic disks remain completely flat and parallel to one another, and each of said opposite major surfaces has a recording/reproducing function and (3) including a first core body and a second core body connected to each other by a shock-absorbing portion therebetween, whereby said opposite major surfaces contact said adjacent magnetic disks with substantially the same load to prevent pressure from concentrating on one surface of said head core and thereby ensuring stable contact of said head core and said adjacent magnetic disks.

* * * * *